United States Patent
Suzuki et al.

(10) Patent No.: US 6,745,349 B1
(45) Date of Patent: Jun. 1, 2004

(54) CD-ROM DECODER AND METHOD FOR TEMPORARILY STORING AND RETRIEVING DIGITAL DATA

(75) Inventors: Takayuki Suzuki, Gifu (JP); Hiroyuki Tsuda, Ichinomiya (JP); Masayuki Ishibashi, Yao (JP)

(73) Assignee: Sanyo Electric Co., Ltd., Osaka (JP)

( * ) Notice: Subject to any disclaimer, the term of this patent is extended or adjusted under 35 U.S.C. 154(b) by 489 days.

(21) Appl. No.: 09/678,987

(22) Filed: Oct. 4, 2000

(30) Foreign Application Priority Data

Oct. 5, 1999  (JP) .......................... 11-284469
Oct. 5, 1999  (JP) .......................... 11-284470

(51) Int. Cl.⁷ ............................................... G06F 11/00
(52) U.S. Cl. .......................... 714/48; 714/746; 710/52; 369/47.1
(58) Field of Search ...................... 714/48, 746; 710/52; 369/47.1, 53.41, 53.2

(56) References Cited

U.S. PATENT DOCUMENTS

| 6,226,247 B1 | * | 5/2001 | Sako et al. | 369/53.31 |
| 6,259,659 B1 | * | 7/2001 | Fechser et al. | 369/47.1 |
| 6,272,084 B1 | * | 8/2001 | Maeda | 369/47.34 |
| 6,285,637 B1 | * | 9/2001 | Manter et al. | 369/47.1 |
| 6,539,518 B1 | * | 3/2003 | Fang et al. | 714/805 |
| 6,564,352 B1 | * | 5/2003 | Furuhashi et al. | 714/801 |
| 6,584,527 B2 | * | 6/2003 | Verinsky et al. | 710/305 |

* cited by examiner

*Primary Examiner*—Scott Baderman
*Assistant Examiner*—Anne L. Damiano
(74) *Attorney, Agent, or Firm*—Fish & Richardson P.C.

(57) ABSTRACT

A CD-ROM decoder that performs code error correction and/or code error detection on digital data partitioned in sectors having a certain format includes a circuit for reading and analyzing the header information stored with each sector of CD-ROM data, which relieves a control microprocessor of having to perform such task. A header information register stores the header information for each sector of data. A sector information conversion circuit connected to the header information register determines the specific format of the sector data and generates corresponding sector information. The sector data and the corresponding sector information are stored in a buffer memory.

12 Claims, 5 Drawing Sheets

| Format | Sector Info |
|---|---|
| Mode 0 | 000b |
| Mode 1 | 010b |
| Mode 2   Formless | 011b |
| Mode 2   Form 1 | 100b |
| Mode 2   Form 2 | 101b |
| Others | 111b |

CD-ROM DECODER AND METHOD FOR TEMPORARILY STORING AND RETRIEVING DIGITAL DATA

BACKGROUND OF THE INVENTION

The present invention relates to a CD-ROM decoder, and more particularly, to a CD-ROM decoder that corrects a code error contained in digital data and transfers the corrected digital data to a computer.

When a computer acquires digital data recorded on a recording medium, decode processing for correcting a code error contained in the digital data is executed using a drive system such as a CD-ROM system. Since the decode processing is executed in units of sectors that consist of a predetermined number of bytes, the digital data is buffered in a memory in units of sectors.

FIG. 1 is a schematic block diagram of a CD-ROM system 100. Digital data that conforms to a predetermined format is recorded on a disk 1 along a recording track drawn in a spiral shape. The disk 1 rotates so that a linear velocity or an angular velocity is maintained constantly. A pickup 2 irradiates the surface of the disk 1 with laser light and reads the digital data recorded on the disk 1 in accordance with a variation of the reflected light. An analog signal processing circuit 3 processes an analog output signal from the pickup 2 and generates an Eight to Fourteen Modulation (EFM) signal indicating the digital data. The EFM signal is generated by EFM-modulating 8-bit data. As shown in FIG. 2, for EFM data, the first 24 bits of one frame are assigned to a synchronous field. A three bit connection field and a 14 bit data field are alternately assigned after the synchronous field.

A digital signal processing circuit 4 receives the EFM signal from the analog signal processing circuit 3, applies EFM demodulation to the EMF signal and, as shown in FIG. 2, converts the 14-bit data to 8-bit data. In the EFM demodulation, 1-byte subcode data is fetched from the first data field after the synchronous signal and 32-bytes of symbol data are generated from the remaining data fields. The digital signal processing circuit 4 applies CIRC decoding to the 32-bytes of symbol data and generates 24-bytes of CD-ROM data.

The CD-ROM data is handled in units of sectors consisting of 2,352 bytes (24 bytes×98 frames), as shown in FIG. 3. A synchronous signal (12 bytes) and a header (four bytes) are assigned to the beginning of one sector. The synchronous signal is a fixed pattern indicating the top position of a sector. Information (minute/second/frame number: one byte each) about the absolute time that corresponds to an address on the disk and a mode identification code (one byte) that identifies a data format in the sector are assigned to the 4-byte header. User data, an error correction code (ECC) and an error detection code (EDC) are assigned to the 2,336 bytes following the header in accordance with the mode and the form.

For example, as shown in FIG. 4, in mode 1, user data (2,048 bytes), an EDC (4 byes), zero (8 bytes) and an ECC (276 bytes) are defined. In form 1 of mode 2, the subheader (8 bytes), user data (2,048 bytes), the EDC (4 bytes) and the ECC (276 bytes) are defined. In mode 2 form 2, the subheader (8 bytes), user data (2,324 bytes) and the EDC (4 bytes) are defined.

A CD-ROM decoder 5 receives the CD-ROM data from the digital processing circuit 4, performs a code error correction on the CD-ROM data and transfers the corrected CD-ROM data to a host computer in accordance with a request from the host computer. A buffer RAM 6 is connected to the CD-ROM decoder 5 and stores the CD-ROM data supplied from the digital signal processing circuit 4 to the CD-ROM decoder 5 for a predetermined time. Since the ECC and the EDC are set for the one sector CD-ROM data, at least one sector of CD-ROM data is stored in the buffer RAM 6. Further, the several sectors of error-corrected CD-ROM data are stored in the buffer RAM 6 for the host computer.

A control microcomputer 7 controls the analog signal processing circuit 3, the digital signal processing circuit 4 and the CD-ROM decoder 5 in accordance with a predetermined operation program. The control microcomputer 7 controls the analog signal processing circuit 3, the digital signal processing circuit 4 and the CD-ROM decoder 5 in accordance with a request from the host computer to transfer the CD-ROM data to the host computer.

In the CD-ROM system 100, header information is supplied to the control microcomputer 7 every sector. The control microcomputer 7 identifies the format of each sector of CD-ROM data based on the header information and controls the CD-ROM decoder 5 in accordance with the identified format.

When CD-ROM data is transferred to the host computer, it is necessary to identify the format of the sector being transferred. This is because the position of data in a sector differs depending on the mode, as shown in FIG. 4. Thus, as previously discussed, the control microcomputer 7 identifies the format of each sector and transfers the user data to the host computer based on the identified format.

Further, in the CD-ROM data correction and detection process, it is necessary to identify the format of a sector to be processed. That is, if the ECC and the EDC are set in the CD-ROM data, the code error detection is performed after the code error correction. If only the EDC is set, only the code error detection is performed. The control microcomputer 7 switches the error processing based on the format of each sector.

In mode 1, the format of each sector is determined by the mode identification code contained in the header of the CD-ROM data. In mode 2, the format of each sector is determined from the subheader data. These determination operations increase the load on the control microcomputer 7. In particular, if the operating speed of the host computer is increased, the load on the control microcomputer 7 increases, so that it is difficult for the control microcomputer 7 to adequately control the analog signal processing circuit 3, the digital signal processing circuit 4 and the CD-ROM decoder 5 at high speed.

SUMMARY OF THE INVENTION

An object of the present invention is to provide a CD-ROM decoder having reduced load on the control microcomputer.

In one aspect of the present invention, a CD-ROM decoder that performs a code error correction and/or a code error detection on digital data partitioned in a plurality of sectors each having a predetermined format is provided. The digital data of each sector includes header information. The CD-ROM decoder includes a header information register that stores the header information contained in each sector of the digital data. A sector information conversion circuit is connected to the header information register to determine the format of each sector in accordance with the header information and generating sector information for each sector based on the determination result. The digital data of each sector and the sector information of each sector are stored in a buffer memory.

In another aspect of the present invention, a method for temporarily storing digital data partitioned in a plurality of sectors each having a predetermined format in a buffer memory is provided. First, a first address area for storing digital data of N (N is an integer of 2 or more) sectors are defined in the buffer memory. Then, a second address area for storing sector information for the N bytes are defined in the buffer memory. Each piece of sector information indicates the format of a corresponding sector of digital data. The digital data is stored in the first address area in units of sectors, and the sector information is stored in the second address area in correspondence with each sector of digital data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
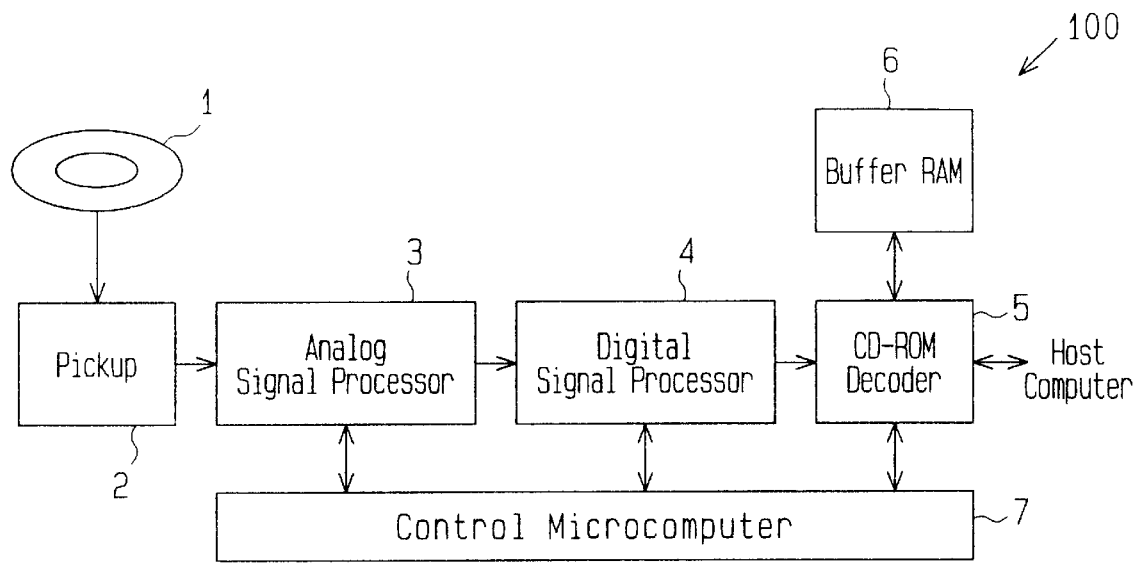
FIG. 1 is a schematic block diagram of a conventional CD-ROM system.
Figure 2:
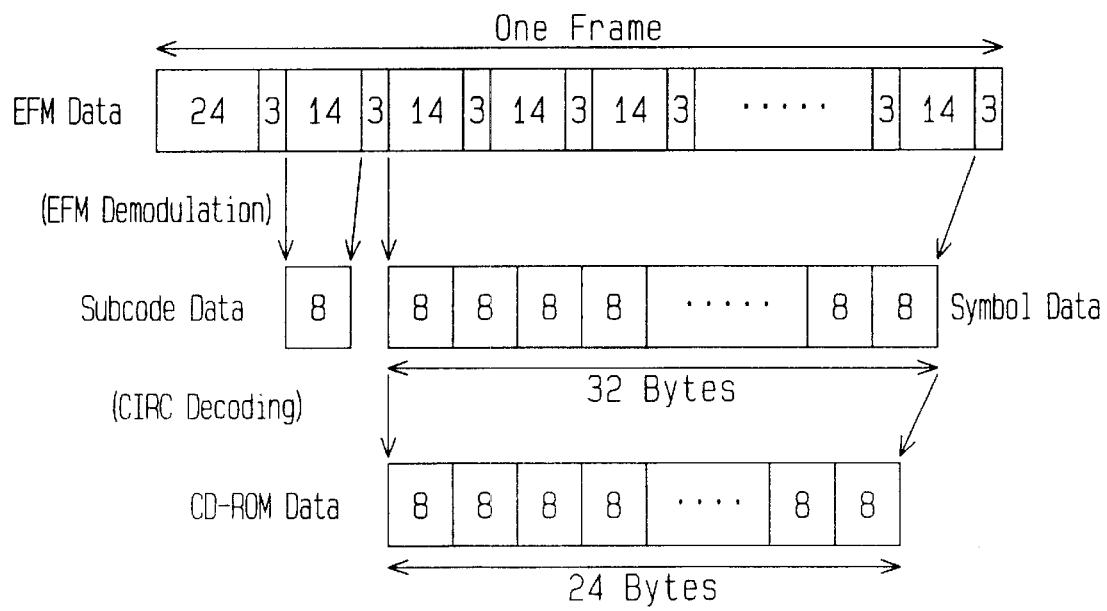
FIG. 2 is a diagram showing the format of one-frame of CD-ROM data.
Figure 3:
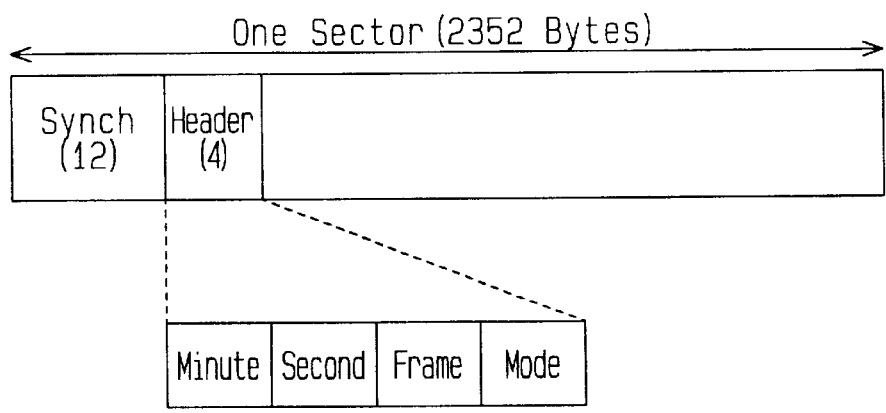
FIG. 3 is a diagram showing the configurations of one sector of CD-ROM data.
Figure 4:
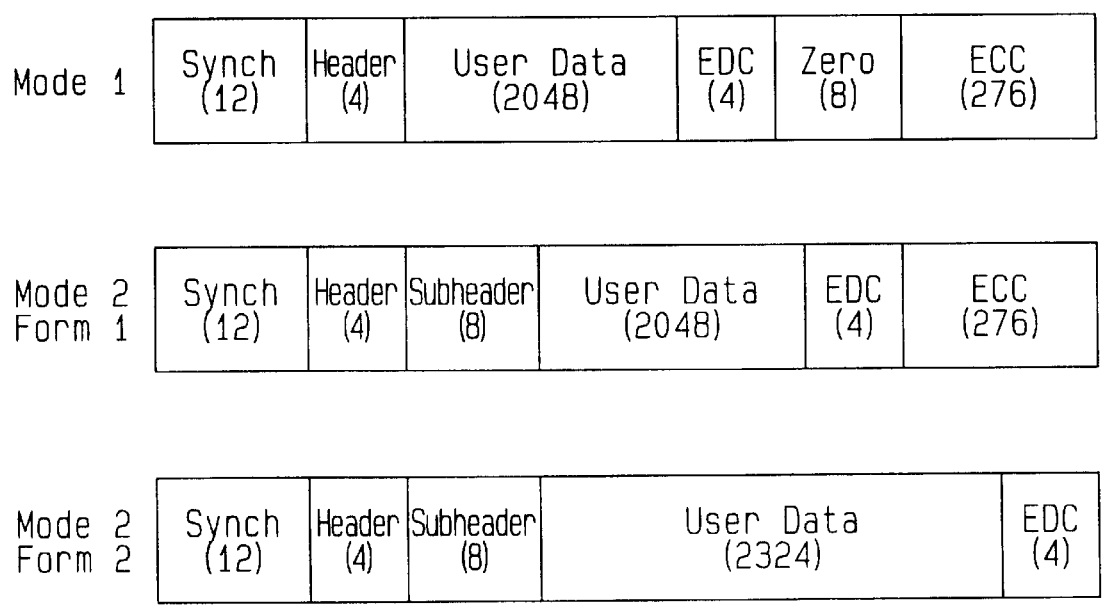
FIG. 4 is a diagram showing various formats of one sector of CD-ROM data.
Figure 5:
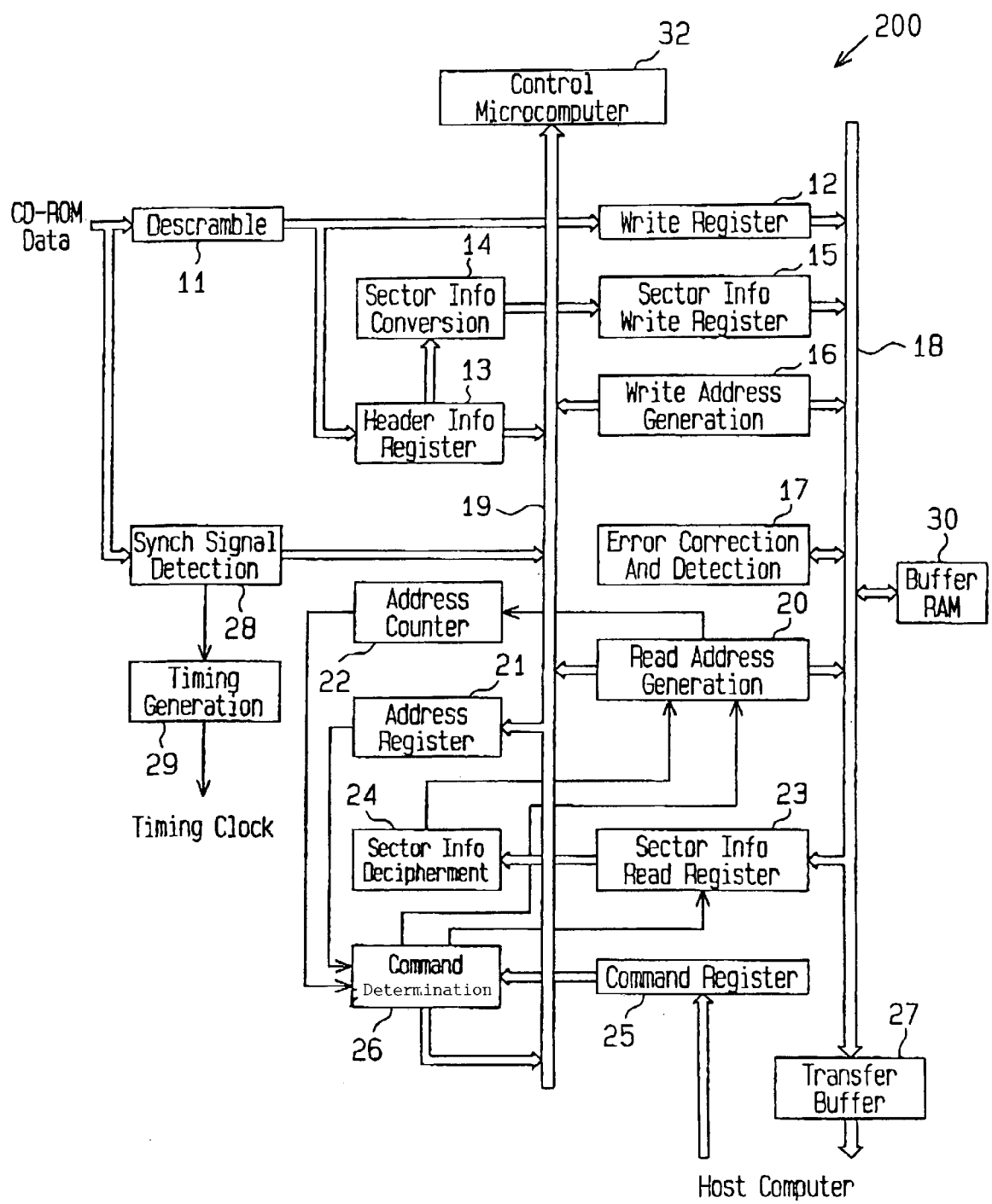
FIG. 5 is a schematic block diagram of a CD-ROM decoder according to one embodiment of the present invention.

FIG. 5 is a schematic block diagram of a CD-ROM decoder 200 according to one embodiment of the present invention. The CD-ROM decoder 200 is connected to a buffer RAM 30 and a control microcomputer 32.

A descramble circuit 11 applies descramble processing to 2,340 bytes of data, excluding a 12 byte synchronous of 2,352 bytes of CD-ROM data (one sector) and generates predetermined formatted data. A write register 12 receives the CD-ROM data from the descramble circuit 11 and stores the CD-ROM data in the buffer RAM 30 via a first data bus 18.

A header information register 13 acquires a 4-byte header included in the CD-ROM data supplied from the descramble circuit 11 and transfers the header information to the control microcomputer 32 via a second data bus 19. The header information register 13 acquires 8-byte data following the header as a subheader and supplies the header and the subheader (also including the data assumed as the subheader) to a sector information conversion circuit 14.

The sector information conversion circuit 14 determines the mode based on the header, determines the form in mode 2 based on the subheader, and generates 3-bits of sector information that indicates the format of the sector based on the determination result. A sector information write register 15 receives the sector information from the sector information conversion circuit 14 and stores the sector information in the buffer RAM 30 via the first data bus 18.

Figures 6, 8:
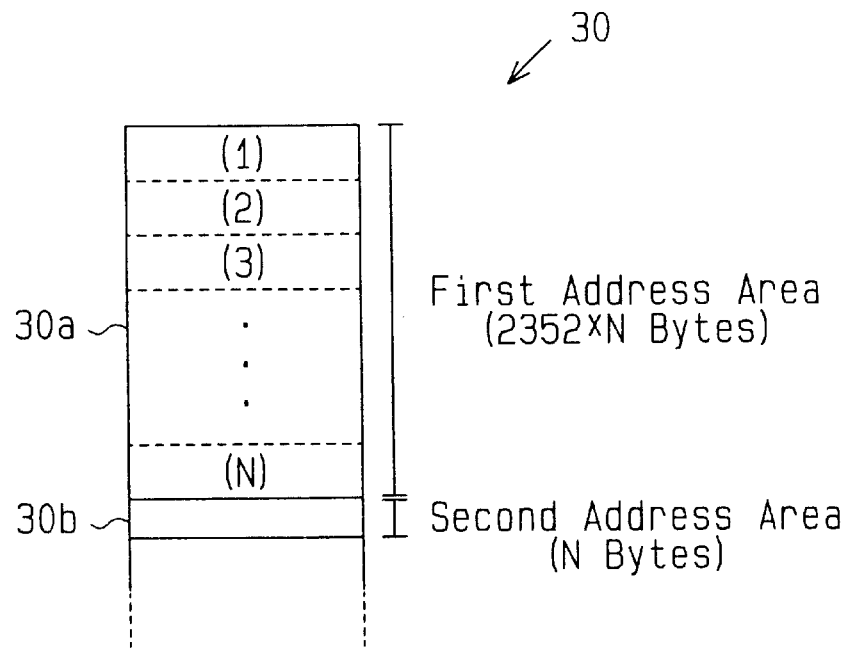
FIG. 6 is a diagram showing the address assignment status of a buffer RAM of the present invention.
FIG. 8 is a diagram showing interrelations between the format of a sector and sector information.

The buffer RAM 30 has the capacity to store several sectors of CD-ROM data in case of the data transfer to the host computer. As shown in FIG. 6, the buffer RAM 30 has a first address area 30a of 2,352×N bytes for storing the CD-ROM data and a second address area 30b of N bytes for storing the sector information. By providing the address areas, one sector of CD-ROM data and the corresponding sector information can be stored in the buffer AM 30. The second address area 30b may also be located separately from the first address area 30a. However, as shown in FIG. 6, it is preferable that the second address area 30b is located adjacent to the first address area 30a to facilitate address management.

A write address generation circuit 16 generates an address that specifies an area of one sector (2,352 bytes) in the first address area 30a and specifies a CD-ROM data write address of the CD-ROM data latched in the write register 12. The write address includes a head address that corresponds to data at the head of each sector. The head address is supplied to an address register 21 via the second data bus 19. The write address generation circuit 16 generates an address that specifies a 1-byte area in the second address area 30b and specifies a sector information write address of the sector information latched in the sector information write register 15. The sector information write address is supplied to the address register 21 in the same manner as the head address.

An error correction detection circuit 17 receives the CD-ROM data read from the first address area 30a of the buffer RAM 30 in units of one sector and receives the sector information read from the second address area 30b. The error correction detection circuit 17 determines the processing to be applied to CD-ROM data in accordance with the sector information. For example, if the sector information indicates form 1 of mode 1 or mode 2, the code error correction and detection are executed, and if it indicates form 2 of mode 2, only the code error detection is executed. The error processed CD-ROM data is temporarily stored in the buffer RAM 30 before being transferred to the host computer.

A read address generation circuit 20 generates addresses that specify the first address area 30a and the second address area 30b in accordance with determination results of a sector information decipherment circuit 24 and a command determination circuit 26. The CD-ROM data and the sector information are read from the buffer RAM 30 in accordance with these addresses.

The address register 21 receives a write address of top data of each sector and a write address of the sector information from the write address generation circuit 16 and temporarily stores these write addresses. That is, as shown in FIG. 6, since the N sectors of CD-ROM data are stored in the first address area 30a of the buffer RAM 30, the write addresses of the N sectors of the top data are stored in the address register 21. Further, since N pieces of sector information which correspond to N sectors of the CD-ROM data are stored in the second address area 30b, each sector information write address is stored in the address register 21.

An address counter 22 increments a count value each time the read address generation circuit 20 updates an address and supplies the count value to the command determination circuit 26. The address counter 22 performs the count operation while the read address generation circuit 20 is supplying the read address to the buffer RAM 30 to count the number of bytes of the data read from the buffer RAM 30.

A sector information read register 23 temporarily stores the sector information read from the buffer RAM 30. The sector information decipherment circuit 24 identifies the format of the sector CD-ROM data that corresponds to the sector information based on the sector information stored in the sector information read register 23. The sector information decipherment circuit 24 sets an address offset generated by the read address generation circuit 20 in accordance with the format of the CD-ROM data when data is transferred to the host computer. That is, since user data excluding the header and the subheader is transferred to the host computer, the addresses of the header and the subheader are added to the top address in accordance with the sector format.

A command register 25 temporarily stores a command such as a transfer instruction sent from the host computer. The command determination circuit 26 provides an operation instruction to the read address generation circuit 20 and the sector information read register 23 in accordance with the top write address and the sector information write address sent from the address register 21, the count value sent from the address counter 22 and the command sent from the command register 25. That is, if a transfer request for a specific sector is provided from the host computer, the command determination circuit 26 determines whether the specific sector is stored in the buffer RAM 30. If the target sector is stored in the buffer RAM 30, the sector information that corresponds to the target sector is temporarily stored in the sector information read register 23 and the format of the target sector is determined based on the sector information. Subsequently, based on the determination result of the format, the read address generation circuit 20 generates a read address in which an offset address is added to the top address, and the user data of the target sector is read from the buffer RAM 30 using the read address.

For example, if the target sector is mode 1, the target sector user data is read from the buffer RAM 30 in accordance with the read address obtained by adding the offset address (the 12-byte synchronous signal address and the 4-byte header address) to the top address stored in the address register 21. When reading of the user data is started, the address counter 22 counts the number of bytes of the user data read from the buffer RAM 30. If the number of bytes reaches the number of bytes indicated by the host computer, the command determination circuit 26 stops the operation of the read address generation circuit 20. Accordingly, the data stored in the buffer RAM 30 is automatically transferred to the host computer without control of the control microcomputer 32.

If the target sector CD-ROM data is not stored in the buffer RAM 30, the command determination circuit 26 sends a read instruction of new CD-ROM data to the control microcomputer 32 via the second data bus 19. The control microcomputer 32 controls the pickup 2, the analog signal processing circuit 3 and the digital signal processing circuit 4 so that the new CD-ROM data is read in response to the read instruction. Then, after the target sector has been stored in the buffer RAM 30, the aforementioned automatic transfer operation is performed.

The transfer buffer 27 receives the user data read from the buffer RAM 30 via the first data bus 18 in accordance with the address of the read address generation circuit 20 and transfers the user data to the host computer.

A synchronous signal detection circuit 28 detects a first assigned 12-byte synchronous signal of each sector and generates a timing signal indicating the beginning of the sector. The synchronous signal detection circuit 28 transfers data indicating a detection error to the control microcomputer 32 through the second data bus 19 if the synchronous signal is not detected.

A timing generation circuit 29 receives a timing signal from the synchronous signal detection circuit 28 and generates various timing clock signals. The timing clock signals are supplied to the control microcomputer 32, the analog signal processing circuit 3 and the digital signal processing circuit 4 to determine their operation timings.

In the CD-ROM decoder 200, the sector information indicating the format of the CD-ROM data of each sector is stored in the buffer RAM 30 together with the CD-ROM data. The sector information stored in the buffer RAM 30 can be used for switching control of the processing of the error correction detection circuit 17 or transfer control of user data to the host computer. That is, the format of each sector can be identified without using the control microcomputer 32 based on the sector information.

Figure 7:
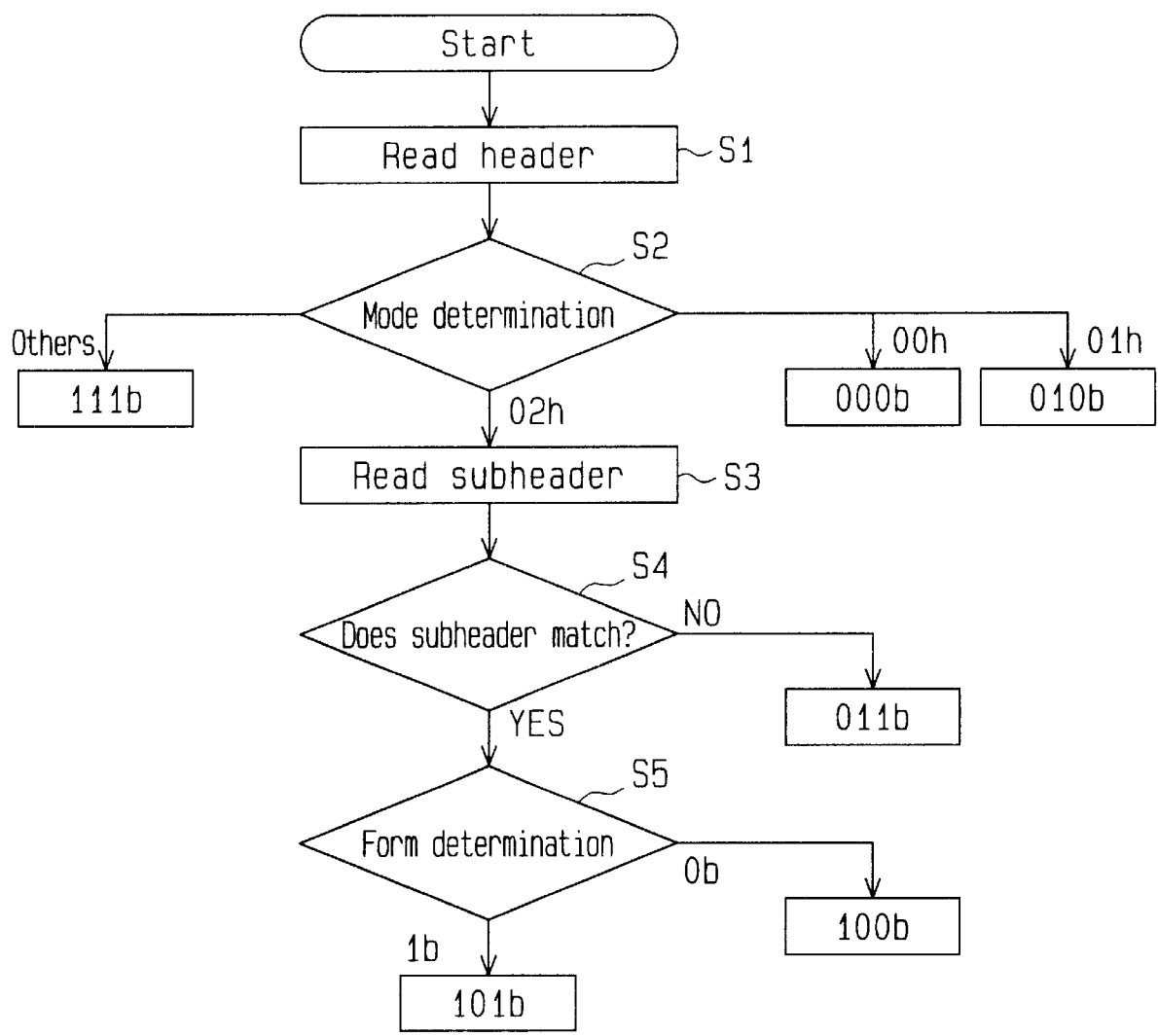
FIG. 7 is a flowchart describing a determination operation of a sector type in accordance with the present invention.

FIG. 7 is a flowchart describing the operation of the decoder 200. FIG. 8 is a diagram showing the relationship between the format of CD-ROM data and the sector information. The sector information is determined by the sector information conversion circuit 14 based on the header and the subheader.

In step S1, the header at the top position of the CD-ROM data is read and subsequently in step S2, the mode identification code of the header is determined. In this determination, if the 1-byte mode identification code is "00h" (h: represents a hexadecimal number), sector information "000b" (b: represents a binary number) is determined. If it is "01h" sector information "010b" is determined. Sector information "000b" indicates mode 0 and "010b" indicates mode 1. If the mode identification code is "02h" processing proceeds to step S3. If the mode identification code is not any of "00h", "01h" and "02h" sector type data "111b" is determined.

In step S3, the 8-byte subheader following the header is read. In subsequent step S4, the first-half 4-byte subheader data and latter-half 4-byte subheader data are compared. That is, since the subheader consists of two identical 4-bytes of data, the subheader is detected by detecting matching of the two data. In step S4, if the matching of the subheader is not confirmed, sector information "011b" indicating that the format is formless without the subheader in mode 2 is determined. If matching of the subheader is confirmed, processing proceeds to step S5 and determination of the form is performed. That is, if a specific bit of a subheader is "0b" sector information "100b" is determined, and if the specific bit is "1b", sector information "101b" is determined. The sector information "100b" indicates form 1 in mode 1 and "101b" indicates form 2 in mode 2.

By the aforementioned determination operation, as shown in FIG. 8, 3-bit binary sector information is generated. Then, the sector information, which is generated by adding five fixed-value bits to the three bits, are stored in the second address area 30b of the buffer RAM 30 in units of one byte. The five fixed-value bits may include information other than the sector information.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A CD-ROM decoder that performs a code error correction and/or a code error detection on digital data partitioned in a plurality of sectors each having a predetermined format, wherein the digital data of each sector includes header information, the CD-ROM decoder comprising:

a header information register that stores the header information contained in each sector of the digital data;

a sector information conversion circuit connected to the header information register for determining the format of each sector in accordance with the header information and generating sector information for each sector based on the determination result, wherein the digital data of each sector and the sector information of each sector are stored in a buffer memory;

a sector information read register which receives and stores sector information when read from the buffer memory;

a sector information decipherment circuit connected to the sector information read register which receives sector information stored therein and identifies the format of the sector data corresponding to that sector information and in accordance with the format, sets an address offset from a read address for reading the digital data of that sector from the buffer memory with the offset excluding the header information when information from the buffer memory is retrieved for that sector using the offset.

2. The CD-ROM decoder of claim 1, wherein the digital data of the plurality of sectors is stored in a first address area partitioned in the buffer memory and the sector information of the plurality of sectors is stored in a second address area partitioned in the buffer memory.

3. The CD-ROM decoder of claim 2, further comprising an error correction and detection circuit connected to the buffer memory for determining a condition of error correction and detection processes to be performed on the digital data of each sector based on the sector information stored in the buffer memory.

4. The CD-ROM decoder of claim 3, wherein the error correction and detection circuit performs code error correction and detection on the digital data of each sector or error detection on the digital data of each sector based on the sector information.

5. The CD-ROM decoder of claim 1, further comprising a read address generation circuit connected to the sector information decipherment circuit and the buffer memory for generating the read address.

6. The CD-ROM decoder of claim 5, further comprising a transfer buffer connected to the buffer memory and transfers the digital data of each sector read from the buffer memory to a computer.

7. The CD-ROM decoder of claim 1, wherein the header information includes a mode identification code, and the sector information conversion circuit generates the sector information in accordance with the mode identification code.

8. A method for temporarily storing and retrieving digital data partitioned in a plurality of sectors each having a predetermined format in a buffer memory, wherein each sector of digital data includes header information, the method comprising the steps of:

defining a first address area for storing digital data of N sectors in the buffer memory, wherein N is an integer at least equal to two;

defining a second address area for storing sector information for the N bytes in the buffer memory, wherein each piece of sector information indicates the format of a corresponding sector of digital data;

storing the digital data in the first address area in units of sectors;

storing the sector information in the second address area in correspondence with each sector of digital data;

retrieving each piece of sector information from the buffer memory and identifying the format of the sector of digital data corresponding to each piece of sector information;

setting an offset for reading the digital data of each sector stored in the first address area from a read address for each sector, with offset excluding the header information for that sector; and reading the digital data for each sector from the first memory area in accordance with the corresponding offset.

9. The method of claim 8, wherein each piece of sector information is less than one byte.

10. The method of claim 8, further comprising the step of generating the sector information based on the header information included in the digital data of each sector.

11. The method of claim 10, wherein the header information includes a mode identification code and the step of step generating sector information is performed in accordance with the mode identification code of the header information for each sector.

12. The method of claim 8, wherein the first address area and the second address area are defined at continuous addresses in the buffer memory.

* * * * *